United States Patent [19]

Mueller et al.

[11] 4,425,571
[45] Jan. 10, 1984

[54] CHART RECORDER

[75] Inventors: William C. Mueller, La Grange Park; Larry Plunkett, Rellwood, both of Ill.

[73] Assignee: The Perkin-Elmer Corporation, Norwalk, Conn.

[21] Appl. No.: 354,407

[22] Filed: Mar. 3, 1982

[51] Int. Cl.³ .................. G01D 15/24; G05B 19/29
[52] U.S. Cl. .................................. 346/136; 318/603
[58] Field of Search .............. 346/136, 139; 318/603, 318/609

[56] References Cited

U.S. PATENT DOCUMENTS 3,492,553 1/1970 Gordon et al. .............. 346/136 X
4,038,664 7/1977 Muir .......................... 346/136 X
4,283,732 8/1981 Akitomo et al. ............. 346/136 X
4,356,439 10/1982 Mott et al. .................. 318/603 X Primary Examiner—Donald A. Griffin
Attorney, Agent, or Firm—F. L. Masselle; E. T. Grimes; R. A. Hays

[57] ABSTRACT

An improvement to a chart recorder where the chart paper is driven by a motor responsive to pulses counted by a microprocessor makes it possible for the operator to set the pen to a major grid line on the chart at any time after initialization by merely pressing a key. Using a programmed counter the microprocessor keeps track constantly of how many counts the paper has advanced and how far it is to the next major grid line. Upon key command the microprocessor through a software routine advances the paper to the next major grid line. If desired, the routine can also be programmed to raise the pen during advance and lower it at the major grid line.

3 Claims, 3 Drawing Figures

| | | | | | | | |
|---|---|---|---|---|---|---|---|
| 03750 | 00375 | | | | *AUTOADVANCE ROUTINE.... | | |
| 03760 | 00376 | | | | *RESET RUN FLAGS | | |
| 03770 | 00377P | 0205 | BD 02F5 | P | ATOADV JSR | HDSKOF | SOFTWARE |
| 03780 | 00378P | 0208 | 86 04 | A | LDAA | #$04 | |
| 03790 | 00379P | 020A | B7 0000 | A | STAA | CRBEKS | DISABLE IRQ EXT. DRV. |
| 03800 | 00380P | 020D | 96 00 | A | LDAA | STATE1 | |
| 03810 | 00381P | 020F | 84 6F | A | ANDA | #$6F | |
| 03820 | 00382P | 0211 | 97 00 | A | STAA | STATE1 | |
| 03830 | 00383 | | | | * | | |
| 03840 | 00384 | | | | *TEST IF ATOADV FLAG SET | | |
| 03850 | 00385P | 0213 | 86 01 | A | LDAA | #01 | |
| 03860 | 00386P | 0215 | 95 00 | A | BITA | STATE2 | |
| 03870 | 00387P | 0217 | 27 1F | 0238 | BEQ | FRSTME | 1ST TIME KEYDOWN? |
| 03880 | 00388 | | | | * | | |
| 03890 | 00389 | | | | *IF NOT FIRST TIME, HERE.... | | |
| 03900 | 00390P | 0219 | 7F 0000 | A | CLR | STPWD | |
| 03910 | 00391P | 021C | 7D 0000 | A | TST | ADVCTR | IS COUNTER ZERO |
| 03920 | 00392P | 021F | 26 06 | 0227 | BNE | NXTTST | IF SO, BRANCH |
| 03930 | 00393P | 0221 | 86 7D | A | LDAA | #125 | GO TO NEXT GRID LINE |
| 03940 | 00394P | 0223 | 97 01 | A | STAA | STPWD+1 | |
| 03950 | 00395P | 0225 | 20 17 | 023E | BRA | ADVOUT | |
| 03960 | 00396 | | | | * | | |
| 03970 | 00397P | 0227 | 86 7D | A | NXTTST LDAA | #125 | IF NOT, FIND NUMBER |
| 03980 | 00398P | 0229 | 90 00 | A | SUBA | ADVCTR | STEPS TO NEXT GRID L |
| 03990 | 00399P | 022B | 97 01 | A | STAA | STPWD+1 | |
| 04000 | 00400P | 022D | 96 00 | A | LDAA | STATE 2 | |
| 04010 | 00401P | 022F | 8A 20 | A | ORAA | #$20 | |
| 04020 | 00402P | 0231 | 97 00 | A | STAA | STATE 2 | |
| 04030 | 00403P | 0233 | BD 0000 | A | JSR | CHTSTP | |
| 04040 | 00404P | 0236 | 20 06 | 023E | BRA | ADVOUT | |
| 04050 | 00405 | | | | * | | |
| 04060 | 00406P | 0238 | 7C 0000 | A | FRSTME INC | STATE 2 | SET ATDADV FLAG.... |
| 04070 | 00407P | 023B | 7F 0000 | A | CLR | ADVCTR | INIT. COUNTER=0 |
| 04080 | 00408 | | | | * | | |
| 04090 | 00409 | | | | * | | |
| 04100 | 00410P | 023E | 96 00 | A | ADVOUT LDAA | STATE 2 | RESET AUTOFLAG |
| 04110 | 00411P | 0240 | BA DF | A | ANDA | #$DF | I.E. BITS OF STATE 2 |
| 04120 | 00412P | 0242 | 97 00 | A | STAA | STATE 2 | |
| 04130 | 00413P | 0244 | BD 02FF | P | JSR | HDSKON | TURNON HDSK OUTPUT |
| 04140 | 00414P | 0247 | 86 20 | A | LDAA | #$20 | TEST REMOTE FLAG |
| 04150 | 00415P | 0249 | 95 00 | A | BITA | STATE 1 | IF SET, ENABLE |
| 04160 | 00416P | 024B | 27 05 | 0252 | BEQ | KEYJM | EXT. DRV. IRQ INPUT |
| 04170 | 00417P | 024D | 86 05 | A | LDAA | #$05 | |
| 04180 | 00418P | 024F | B7 0000 | A | STAA | CRBEKS | |
| 04190 | 00419P | 0252 | BD 0000 | A | KEYJM JSR | KNOBRD | REINIT. KNUB |
| 04200 | 00420 | 0255 | 7E 00DD | P | JMP | KYEXIT | |

FIG. 3

CHART RECORDER

This application is related to the following three U.S. patent applications filed on even date herewith: (1) Ser. No. 354,408 entitled "Variable Gain Amplifier", by William C. Muellner; (2) Ser. No. 354,405, entitled "Pen Drive for Recorder", by Larkin B. Scott and William C. Muellner; and (3) Ser. No. 354,406, entitled "Strip Chart Recorder", by William C. Muellner and Walter Hvostik.

BACKGROUND OF THE INVENTION

Heretofore strip chart recorders required that the operator set the pen by hand to a desired starting point on the chart for each separate scan, the usual starting point being with the pen on a major grid line of the chart. Despite some attempts to facilitate setting to a major grid line by hardware means such as provision of special perforations or other indexing means in the chart paper or by indexing devices on the chart drive mechanism, automatic indexing still was hard to initially set, required special paper or was limited to particular chart positions rather than to any major grid line. Such systems provided no simple means of readjustment in the event the chart paper expanded or shrank as a result of humidity changes.

It is an objective of our invention to provide microprocessor means which, among other duties, is responsible for the control of the chart drive; to automatically position the chart so that the pen is on a major grid line.

It is further an objective to make the above action take place by the depression of a single key switch by the operator.

It is a further objective to make a simple initialization step at the time of power turn-on the only time the operator must set the pen manually on a grid line.

Yet a further objective is to provide opportunity for equally simple reinitialization in the event that chart damage, removal, shrinkage or expansion due to humidity changes or other abnormal occurrences vitiate the original initialization.

BRIEF DESCRIPTION OF THE INVENTION

Strip chart recorders are so well known in the art that little needs to be detailed herein about their general structure and operation. Our invention is concerned with an improvement to the chart paper drive of a recorder which uses a stepper motor or the equivalent to transport the chart paper and which uses a microprocessor to control this transport. The microprocessor may also perform other duties such as are described in detail in the Related Patent Applications previously listed in this application. The foregoing objectives of this improvement and other relationships to the functioning of the recorder of our preferred embodiment are made possible by directing the attention of the microprocessor to a novel subroutine which on operator command coacts with the microprocessor to accomplish the stated objectives.

The normal forward or reverse drive of the chart, which the above operator command interrupts, is effected by loading a software counter with a count to be used by a paper drive motor routine. This counter will be decremented by one count at each step of the motor, eventually returning to zero at which time the motor stops until the routine is repeated. The microprocessor controls the above routine. The microprocessor also increments or decrements another software counter depending on the direction the paper moves that, once set to zero or initialized at a major grid line, always "knows" the position of the chart relative to the pen. It will be appreciated that the counter as employed by our invention could either be incorporated in the microprocessor or it could be a separate electrical hardware element.

The microprocessor when using the AUTO ADVANCE software routine will drive the stepper motor forward to return this counter to zero thus positioning the paper at a major grid line when the AUTO ADVANCE key is depressed. The step size of the stepper motor of the illustrated embodiment is such that there are 125 steps between major grid lines on the chart. Each time the Auto Advance counter reaches a count of 125 its count is reset to zero. Thus the AUTO ADVANCE routine when called will move the paper to the next major grid line.

BRIEF DESCRIPTION OF THE DRAWINGS

The foregoing and other objects, advantages and features of the present invention are described below in further detail in connection with the drawings which form a part of the disclosure wherein:

FIG. 3 is a typical object code for FIG. 2.

DETAILED DESCRIPTION

The strip chart paper in the recorder of our exemplary preferred embodiment is driven by conventional sprocket or toothed wheels meshing in holes disposed along both edges of the chart strip. The structure is well known for such recorders. The sprocket wheels are driven by a motor which moves a predetermined angular amount each time an electrical pulse is fed to it by a controlling microprocessor. The sequence of the pulses determines the direction of rotation; the total rotation is determined by the number or count of the pulses. Such a motor may be the type known to the art as a stepper motor.

Figure 1:
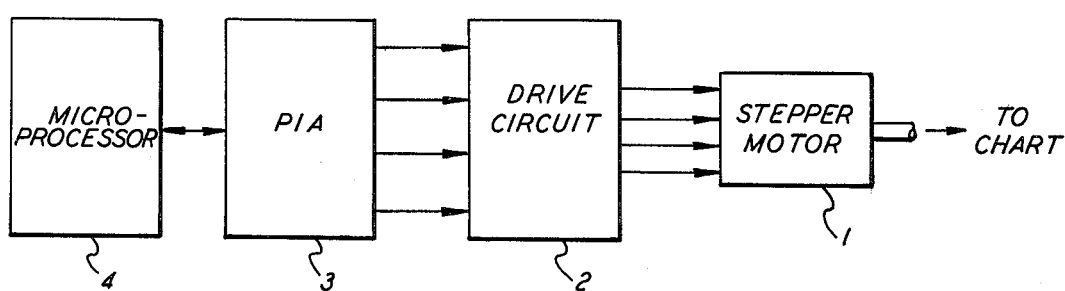
FIG. 1 is a block diagram of the chart drive system.

FIG. 1 is a simplified block diagram of the motor drive system. The stepper motor 1 drives the chart sprockets through a conventional step-down gear train whose gear ratio is chosen so that a given number or count of pulses supplied to the motor will move the chart a desired distance. In the illustrated embodiment this relationship requires 125 counts to move the chart the distance between major grid lines on the chart; however, other count-to-chart travel relationships could be a matter of design choice.

The stepper motor is powered by a Darlington switch chip 2 or other suitable drive circuit depending on the power requirements of the stepper motor. This drive circuit in the illustrated embodiment is a solid state chip called ULN2069B made by Sprague, Inc. The switches in the drive circuit 2 are responsive to output signals from a peripheral interface adaptor (PIA) 3 which receives commands from a microprocessor 4. In the illustrated embodiment the PIA is an MC6821 and the microprocessor an MC6802, both made by Motorola, Inc. Programmed software is associated with the microprocessor to effect the desired chart drive and also other functions associated with the recorder operation but not part of this invention. Detailed explanation of the software operation associated with our invention follows.

Figure 2:
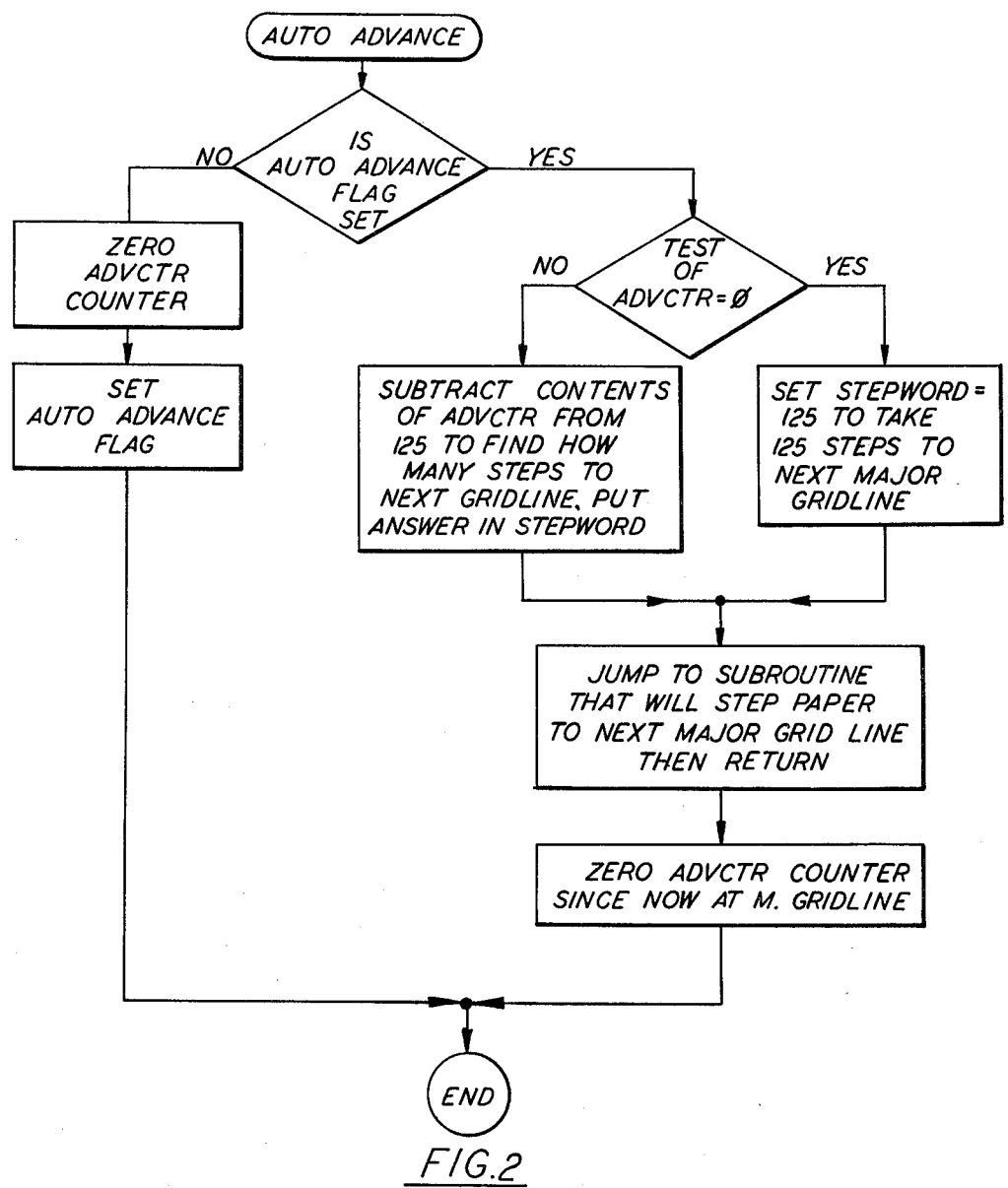
FIG. 2 is a flow chart of the AUTO ADVANCE subroutine.

Reference to the flow chart, FIG. 2 in conjunction with the object code, FIG. 3 will help to clarify how the AUTO ADVANCE subroutine functions. When the recorder power is first turned on the operator manually sets the chart paper in a forward direction so that the pen is at a desired starting point, for example on a major grid line. He then presses the AUTO ADVANCE key. This initiates the AUTO ADVANCE subroutine through a "first time" procedure. An AUTO ADVANCE flag is clear, i.e. at zero. The routine then resets this flag and returns a counter (ADVCTR) to zero thus establishing the pen position on a major grid line as zero on the ADVCTR counter. The microprocessor then returns to other duties including chart advance during a data scan.

The chart advance during data scan is effected through another software counter labelled STEPWORD used by the paper-drive motor routine (CHTSTP). The CHTSTP routine using the stepper motor drives the paper the number of steps specified by the contents of STEPWORD when the routine is entered. After each step, i.e. pulse applied to the stepper motor, STEPWORD is decremented by one count, eventually reaching zero when all the steps are taken. These steps represent increments of the quantity being plotted by chart advance of the recorder. Each time STEPWORD reaches zero the paper drive routine is exited until further data is entered in STEPWORD.

When a scan is completed, which comprises a plurality of repetitions of the paper drive routine, the operator may wish to start a new scan on a new major grid line. He accordingly depresses the AUTO ADVANCE key thus reentering the AUTO ADVANCE subroutine. This time, however, the AUTO ADVANCE flag is already set and the routine moves to check the ADVCTR. This counter, initially set at zero, is incremented or decremented depending on the direction of the step every time the microprocessor directs the stepper motor to take a step. When the counter reaches 125 counts, i.e. when the next major grid line is reached, the counter automatically resets to zero. Thus the microprocessor always knows how far it is, i.e. how many steps, to the next major grid line. The AUTO ADVANCE routine, to use this information, reads the count in ADVCTR and drives the chart in the forward direction the right number of steps to reach the next major grid line where the ADVCTR returns to zero.

Should the paper expand or contract after a period of time due to humidity change reinitialization may be required. To do this the operator manually moves the paper in a forward direction to again set the pen at a major grid line. This time the operator then simultaneously depresses the ZERO CHECK and AUTO ADVANCE keys. The ZERO CHECK key clears the AUTO ADVANCE flag to zero causing the AUTO ADVANCE subroutine to clear the ADVCTR to zero and reset the AUTO ADVANCE flag as if this were a "first time" initialization.

As described above, the cooperation of a hardware stepper motor chart drive controlled by software through the microprocessor greatly simplifies the procedure for the operator of starting a new scan at a desired starting point, for example a major grid line. The operator's action is reduced to pressing a single AUTO ADVANCE key. Although we have exemplified this in a specific preferred embodiment it should be apparent that modifications can be made to either the hardware drive or the software control routine to adapt our invention to other recorder applications without departing from the spirit and scope of our invention as defined in the following claims.

What is claimed is:

1. In a strip-chart recorder, means initiated by operator command for advancing a recorder chart to a predetermined starting position without residual backlash comprising, in combination:
   a pulse driven motor for driving the strip chart,
   means for supplying drive pulses to said motor, said drive pulse supplying means having a microprocessor controlled pulse drive circuit,
   means for counting, said counting means being effective to count the number of said drive pulses,
   means for resetting said counting means, said resetting means initially resetting said counter means to zero count when the recorder pen is at any chosen starting point and subsequently to repeat said reset each time said counting means reaches a predetermined count; and
   said microprocessor and said counter means being operative, upon operator command, to drive said motor forward to the point at which said counter again reaches zero.

2. A strip-chart recorder according to claim 1 wherein said predetermined count corresponds to the driven distance between consecutive major chart lines on a chart driven by said motor.

3. A strip-chart recorder according to claim 1, wherein said operator command is effected by the operator pressing a key.

* * * * *